(12) United States Patent
Kurokawa et al.

(10) Patent No.: US 6,905,580 B2
(45) Date of Patent: Jun. 14, 2005

(54) WATER TREATING APPARATUS

(75) Inventors: Keiko Kurokawa, Gunma (JP); Masayuki Motegi, Gunma (JP); Toshimitsu Tsukui, Gunma (JP); Tatsuya Hirota, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 185 days.

(21) Appl. No.: 10/326,199

(22) Filed: Dec. 20, 2002

(65) Prior Publication Data

US 2003/0116430 A1 Jun. 26, 2003

(30) Foreign Application Priority Data

Dec. 25, 2001 (JP) ........................................ 2001-391658
Jan. 25, 2002 (JP) ........................................ 2002-016257

(51) Int. Cl.[7] ............................................... C25F 15/00
(52) U.S. Cl. ................................................. 204/228.6
(58) Field of Search ........................ 204/230.2, 290.08, 204/290.14, 228.6

(56) References Cited

U.S. PATENT DOCUMENTS

| | | | |
|---|---|---|---|
| 3,819,329 A | 6/1974 | Kaestner et al. | |
| 4,151,052 A | 4/1979 | Goto et al. | |
| 4,172,773 A | 10/1979 | Pellegri et al. | |
| 4,255,246 A | 3/1981 | Davis | |
| 4,479,864 A | 10/1984 | Kanai et al. | |
| 4,761,208 A | 8/1988 | Gram et al. | |
| 4,992,156 A | * 2/1991 | Silveri | 204/229.5 |

FOREIGN PATENT DOCUMENTS

| | | |
|---|---|---|
| EP | 1 074 515 A2 | 7/2001 |
| WO | 01/42143 A2 | 6/2001 |

OTHER PUBLICATIONS

Lowenheim, Frederick A., Electroplating, American Electroplater's Society, 1978, (pp. 157–163).*

* cited by examiner

*Primary Examiner*—Donald R. Valentine
(74) *Attorney, Agent, or Firm*—Darby & Darby

(57) ABSTRACT

A water treating apparatus is provided which is capable of producing a hypochlorous acid-containing electrolytic water having a satisfactory sterilizing ability in a household. The water treating apparatus is an apparatus for producing hypochlorous acid in for-treatment water containing a salt by use of an electrochemical reaction which occurs in the for-treatment water when a direct current voltage is applied to at least a pair of electrodes oppositely disposed in the for-treatment water, wherein the direct current voltage to be applied to the electrodes is obtained by smoothing an alternating voltage of domestic use power supply into direct current power of a predetermined voltage, an electrode having titanium covered with a coating containing at least palladium or ruthenium is used as an anode, and at most 90% of the salt added to the for-treatment water is converted into hypochlorous acid by the electrochemical reaction.

12 Claims, 11 Drawing Sheets

WATER TREATING APPARATUS

BACKGROUND OF THE INVENTION

1. Field of the Invention

The present invention relates to a water treating apparatus for producing an electrolytic water containing hypochlorous acid.

2. Description of the Related Art

Recently, particularly a problem of infectious diseases caused by bacteria such as Legionella bacteria which grow in a bathroom or the like has been receiving attention. At humidity and temperature in a bathroom, emergence of fungi and proliferation of bacteria such as Legionella bacteria are boosted, and these fungi and Legionella bacteria enter living bodies in which they cause infectious diseases. In general, fungi and Legionella bacteria which have been grown in a high temperature and high humidity environment such as a bathroom are stuck to a bathtub and tiles and diffused in hot water reserved in the bathtub. If one inhales steam generated from the hot water, the bacteria enter his body.

Further, in addition to the bathroom, in a sink as in a kitchen, decay of small pieces of raw food garbage and water cause proliferation of bacteria.

Furthermore, the foregoing bacteria such as Legionella bacteria are also stuck to an air conditioner, an air cleaner, a ventilating fan and the like, and upon operation of these apparatuses, the bacteria are discharged into a room from an air outlet and float in the air. There exists a problem that these floating bacteria cause infectious diseases.

Accordingly, generally a chlorine-based bactericide is applied to a bathtub, tiles, kitchen sink and air outlet as of air conditioning equipment where bacteria such as fungi and Legionella bacteria are stuck, so as not only to kill the bacteria such as fungi but also to prevent further growth of the bacteria. However, since the method requires consumption of the chlorine-based bactericide for every sterilization, it has a problem that costs to purchase the chlorine-based bactericide are liable to become high.

Under the above circumstances, another sterilization method is conceived in which a salt-containing water is electrolyzed so as to produce hypochlorous acid and an electrolytic water containing hypochlorous acid is applied to a bathroom, air conditioning equipment and other places so as to kill bacteria growing at these places.

Meanwhile, when the electrolytic water containing hypochlorous acid is produced by the electrochemical reaction in an ordinary household, service water is generally used. In that case, the concentration of hypochlorous acid obtained is limited to about a few tens of mg/L at the maximum, and the concentration is too low to enable hypochlorous acid to exhibit a satisfactory sterilizing effect in, for example, water containing a large amount of organic components. Further, even if service water is electrolyzed after a salt which is generally constantly stocked in a household is added thereto, only about 30% of the added salt has been successfully converted into hypochlorous acid. Thus, this method also has a problem that a satisfactory sterilizing effect cannot be attained.

SUMMARY OF THE INVENTION

The present invention has been conceived to solve the technical problems of the prior art. An object of the present invention is to provide a water treating apparatus capable of producing a hypochlorous acid-containing electrolytic water having a satisfactory sterilizing ability in a household.

A water treating apparatus of the present invention is an apparatus for producing hypochlorous acid in water to be treated (hereinafter, "water to be treated" will be referred to as "for-treatment water") containing a salt by use of an electrochemical reaction which occurs in the for-treatment water when a direct current voltage is applied to at least a pair of electrodes oppositely disposed in the for-treatment water, wherein the direct current voltage to be applied to the electrodes is obtained by smoothing an alternating voltage of domestic use power supply into direct current power of a predetermined voltage, an electrode having titanium covered with a coating containing at least palladium or ruthenium is used as an anode, and at most 90% of the salt contained in the for-treatment water is converted into hypochlorous acid by the electrochemical reaction.

Further, in the water treating apparatus of the present invention, at least 30% of the salt contained in the for-treatment water is converted into hypochlorous acid by the electrochemical reaction. Further, in the water treating apparatus of the present invention, it is desirable that 50 to 80% of the salt contained in the for-treatment water be converted into hypochlorous acid by the electrochemical reaction.

Further, in the water treating apparatus of the present invention, the concentration of hypochlorous acid produced in the for-treatment water is not lower than 1,000 mg/L.

According to the water treating apparatus of the present invention, by use of service water, an electric power supply for domestic use and a constantly stocked salt in a household, an electrolytic water containing hypochlorous acid at a high concentration can be produced by the catalytic action of palladium or ruthenium of the electrode. Thereby, without purchasing a chlorine-based bactericide, a hypochlorous acid-containing electrolytic water having a satisfactory sterilizing ability can be produced in a household by the electrochemical reaction and used for sterilizing a bathroom, air conditioning equipment, and the like. As a result, a significant reduction in costs can be achieved.

In particular, by converting at least 30% of the salt contained in the for-treatment water into hypochlorous acid so as to produce hypochlorous acid at a concentration of not lower than 1,000 mg/L, hypochlorous acid can exhibit an effective sterilizing ability even inside bacteria.

Further, in the water treating apparatus of the present invention, the coating contains platinum and iridium oxide.

According to the present invention, since the coating contains platinum and iridium oxide, ozone and active oxygen can be produced by the electrochemical reaction and used for sterilization.

Further, in the water treating apparatus of the present invention, an amount of time required for application of the voltage to the electrodes is set based on the concentration of chlorine in the for-treatment water before the application of the voltage.

According to the present invention, since the amount of time required for the application of the voltage to the electrodes is set based on the concentration of chlorine in the for-treatment water prior to the application of the voltage, hypochlorous acid can be produced at a desired high concentration by adjusting the amount of time required for the application of the voltage to the electrodes based on the concentration of chlorine in the for-treatment water in which hypochlorous acid is to be produced.

Further, in the water treating apparatus of the present invention, the voltage is applied to the electrodes based on the concentration of hypochlorous acid in the for-treatment water.

According to the present invention, since the voltage is applied to the electrodes based on the concentration of hypochlorous acid in the for-treatment water, highly concentrated hypochlorous acid required can be produced by adjusting the voltage to be applied based on the concentration of hypochlorous acid.

Further, in the water treating apparatus of the present invention, the concentration of hypochlorous acid produced in the for-treatment water is not lower than 5,000 mg/L.

According to the present invention, since the concentration of hypochlorous acid produced in the for-treatment water is not lower than 5,000 mg/L, a hypochlorous acid-containing electrolytic water having an extremely high sterilizing ability is produced, so that a high degree of sterilization of a bathroom, air conditioning equipment and the like in a household can be achieved securely.

DETAILED DESCRIPTION OF THE PREFERRED EMBODIMENT

Hereinafter, an embodiment of the present invention will be described in detail with reference to the drawings.

Figure 9:
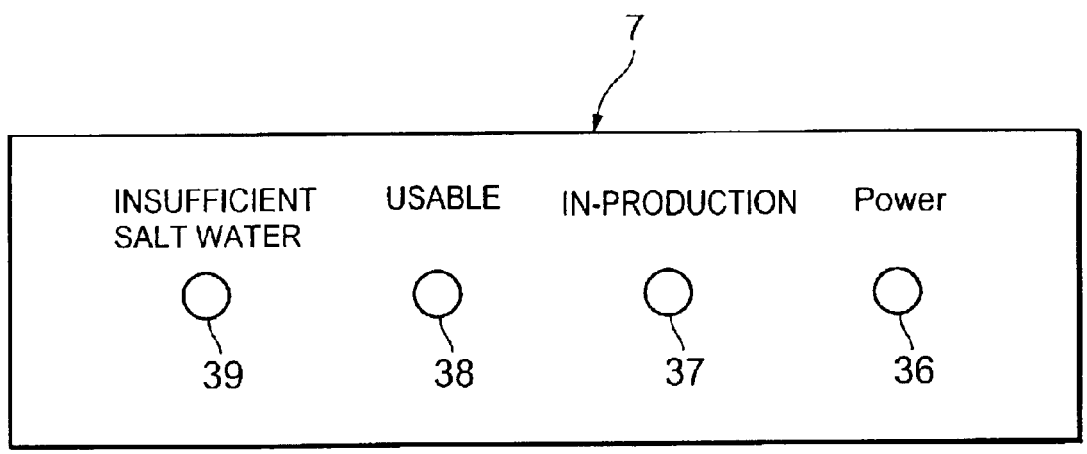
FIG. 9 is a front view of a control panel of the water treating apparatus of FIG. 1.

A water treating apparatus 1 of the embodiment is an apparatus having a desktop size which allows the apparatus to be disposed in a kitchen or other places in an ordinary household. At the front of its main body case 3, an extraction portion 4 is formed in such a manner that a substantial portion of the front surface and front portion of the case 3 is hollowed out toward the central axis of the case 3, and in the middle of the top surface of the main body case 3, a top lid 2 which can be opened and closed freely is provided. Further, in the top surface portion of the main body case 3 which corresponds to the extraction portion 4, a discharge button 5 is provided. In addition, on the upper surface of the extraction portion 4, a discharge opening 6A of an extraction pipe 6 to be described later is provided, and on the front surface portion of the main body case 3 under the extraction portion 4, a control panel 7 which is enlarged and shown in FIG. 9 is provided.

The inside of the main body case 3 is partitioned into three chambers by means of partitions 8 and 9. Further, the middle chamber is partitioned longitudinally into two chambers by means of a partition 11. Thereby, the main body case 3 has an electrical chamber 12 as the back chamber, a salt water chamber 13 as the right chamber of the middle chamber, an electrolysis chamber 14 as the left chamber of the middle chamber, and an extraction chamber 16 which surrounds the extraction portion 4 as the front chamber. The foregoing top lid 2 serves to open and close top surfaces of the middle salt water chamber 13 and electrolysis chamber 14 freely.

In the electrical chamber 12, a circuit board 17 which constitutes a control device C to be described later is accommodated. In the salt water chamber 13, a salt water pump 18 is provided at the bottom. From the salt water pump 18, a salt water feed pipe 19 extends upwardly, and its tip extends over the partition 11 and opens in the electrolysis chamber 14. A motor 13M for the salt water pump 13 is disposed in the electrical chamber 12. Further, at the upper end of the salt water feed pipe 19, a flow rate sensor 24 for detecting a flow rate of a salt water which flows inside the pipe 19 is attached.

Meanwhile, in the electrolysis chamber 14, electrodes 21, 22 and 23 for electrolysis are oppositely disposed, with predetermined spacings being put therebetween. Of the electrodes 21, 22 and 23, electrodes which serve as anodes are constituted by flat titanium electrodes covered with a coating containing palladium or ruthenium, and electrodes which serve as cathodes are constituted by flat titanium electrodes. Further, the electrodes which serve as anodes may also contain platinum and iridium oxide in the coating. As for a combination of the electrodes, a combination of the electrodes 21 and 23 as anodes and the electrode 22 as a cathode or a combination of the electrode 22 as an anode and the electrodes 21 and 23 as cathodes may be used. The three electrodes disposed in the present embodiment may be a pair of electrodes, or four electrodes or five or more electrodes may be oppositely disposed. In this case, a combination of anodes and cathodes may be any conceivable combination of the electrodes.

In the electrolysis chamber 14, a water level sensor 26 which comprises a float switch is provided at a predetermined position in its upper portion, and a similar water level sensor 27 is also provided at a predetermined position in its lower portion. Further, in the electrolysis chamber 14, a service water introducing pipe 28 is inserted from the outside and opened, and to the service water introducing pipe 28, an electromagnetic valve 29 to be described later is provided. Further, in the electrolysis chamber 14, a residual chlorine concentration chamber 31 is installed so as to be exposed therein.

On the other hand, in the lower portion of the extraction chamber 16, an electrolytic water pump 32 and a motor 32M are accommodated, and a suction pipe 33 of the electrolytic water pump 32 is communicated with the inside of the electrolysis chamber 14. The foregoing extraction pipe 6 is connected to an outlet of the electrolytic water pump 32, extends upwardly thorough the inside of the extraction chamber 16, and exposes its discharge opening 6A from the upper surface of the extraction portion 4.

Figure 6:
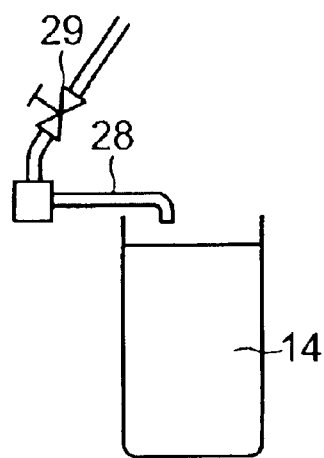
FIG. 6 is a diagram showing a flow of a liquid in a body case of the water treating apparatus of FIG. 1.
Figure 7:
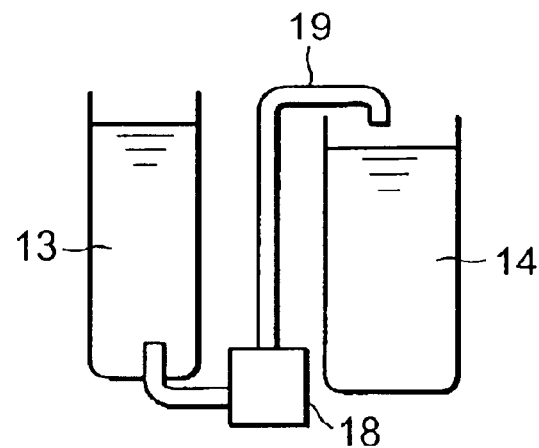
FIG. 7 is another diagram showing a flow of a liquid in the body case of the water treating apparatus of FIG. 1.
Figure 8:
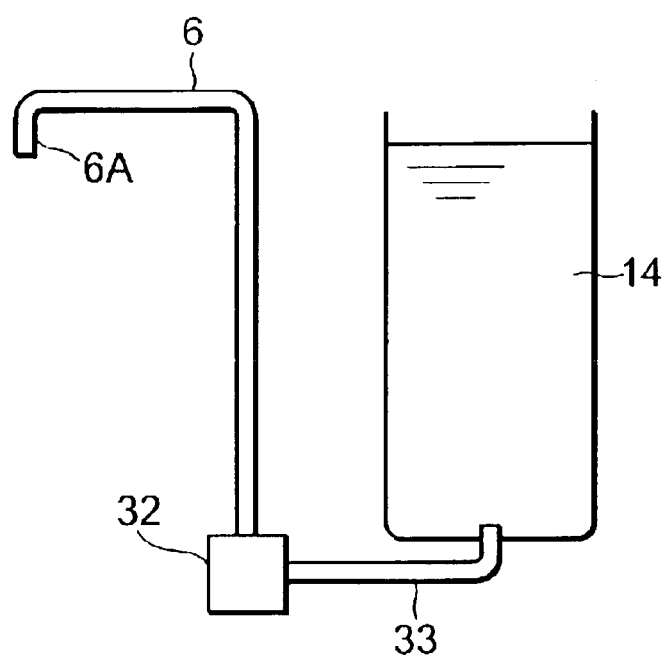
FIG. 8 is another diagram showing a flow of a liquid in the main body case of the water treating apparatus of FIG. 1.

FIGS. 6 to 8 show flows of liquids in the foregoing main body case 3. In FIG. 6, the service water introducing pipe 28 is connected to service water piping (city-administered water piping) which is not shown, and when the electromagnetic valve 29 is opened, the pipe 28 introduces service water (for-treatment water) into the electrolysis chamber 14. The level of water in the electrolysis chamber 14 is detected by the foregoing water level sensors 26 and 27. In FIG. 7, a salt water charged into the salt water chamber 13 in a manner to be described later is sucked through operation of the salt water pump 18 and rises inside the salt water feed pipe 19. Upon reaching the top of the salt water feed pipe 19, the salt water is fed into the electrolysis chamber 14. The amount of the salt water to be fed is detected by the flow rate sensor 24. In FIG. 8, the hypochlorous acid-containing electrolytic water produced in the electrolysis chamber 14 in a manner to be described later is sucked into the suction pipe 33 through operation of the electrolytic water pump 32 and discharged into the extraction pipe 6. The electrolytic water discharged into the extraction pipe 6 rises through the pipe 6 and is eventually discharged from the discharge opening 6A on the upper surface of the extraction portion 4.

Figure 1:
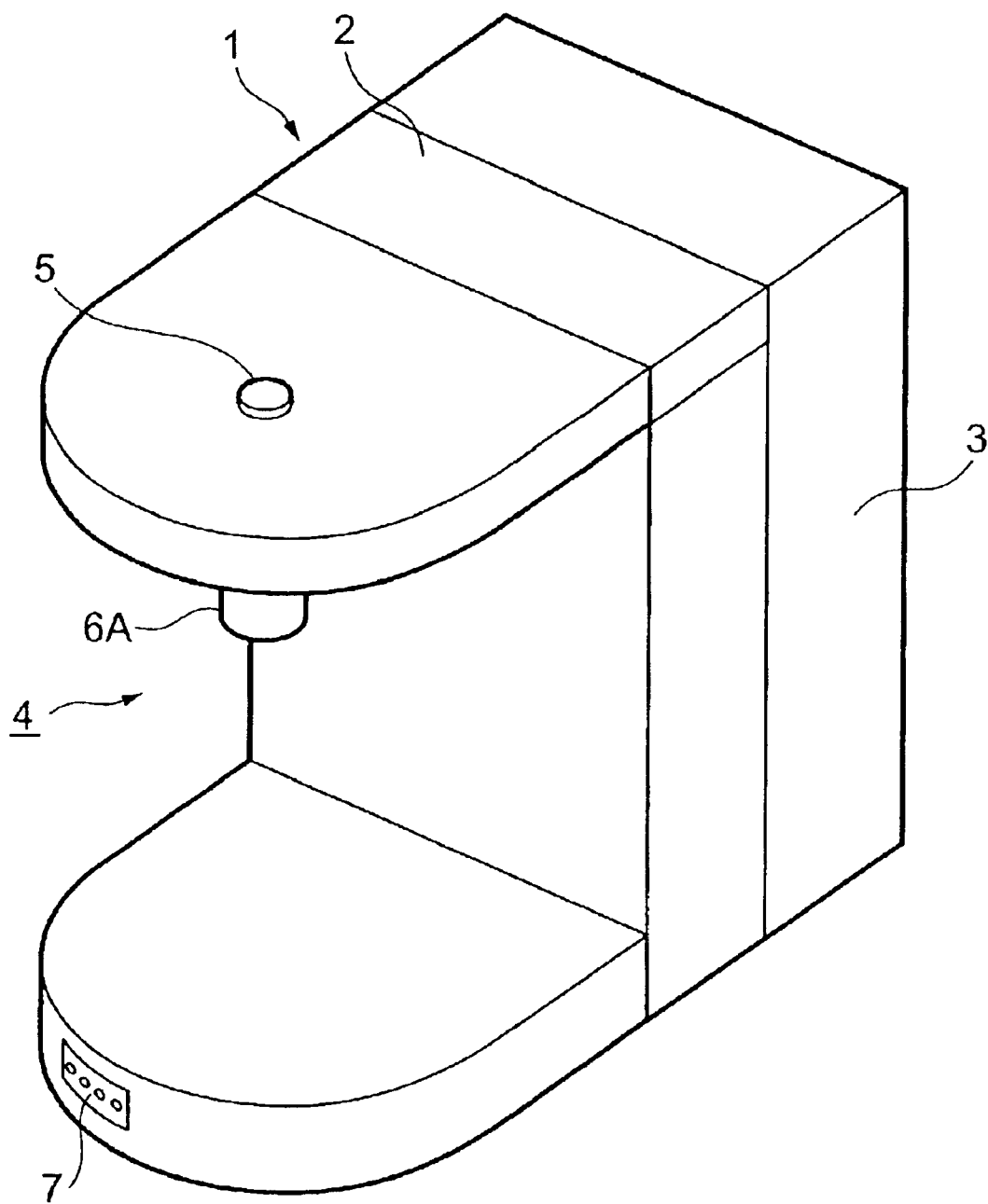
FIG. 1 is an oblique perspective view of a water treating apparatus of an embodiment of the present invention.
Figure 2:
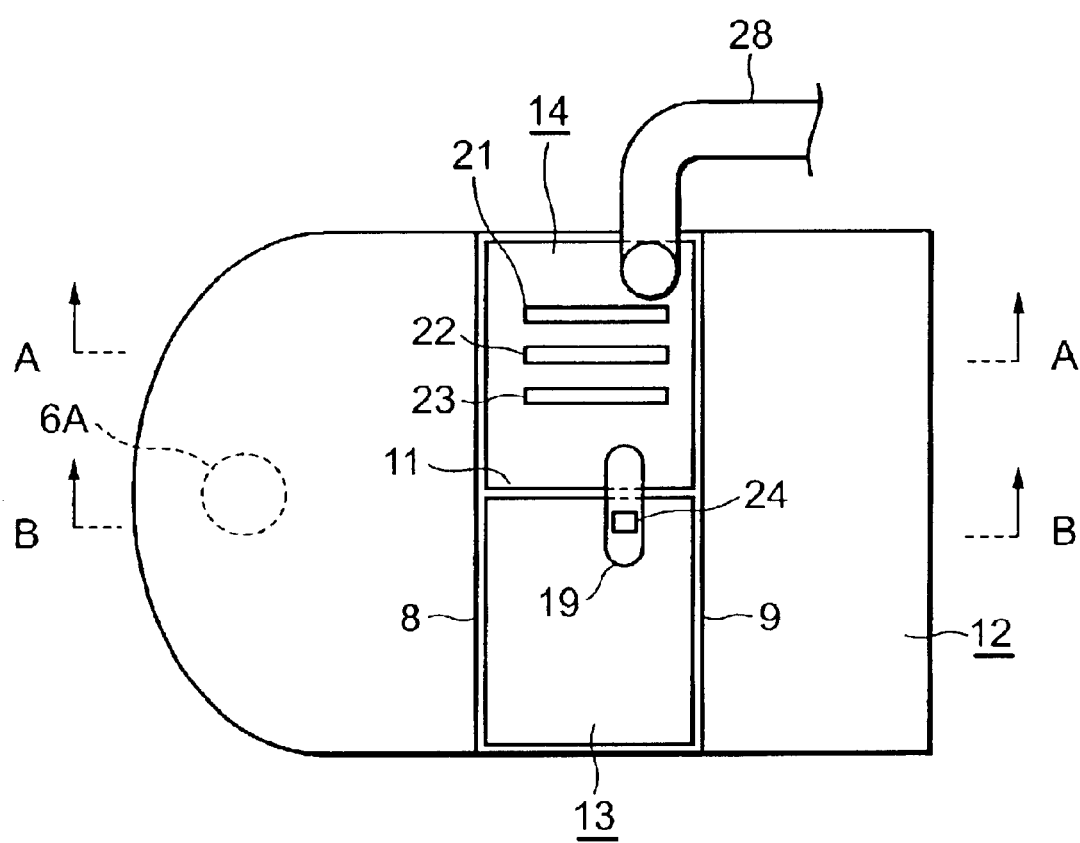
FIG. 2 is a plan view of the water treating apparatus of FIG. 1.
Figure 3:
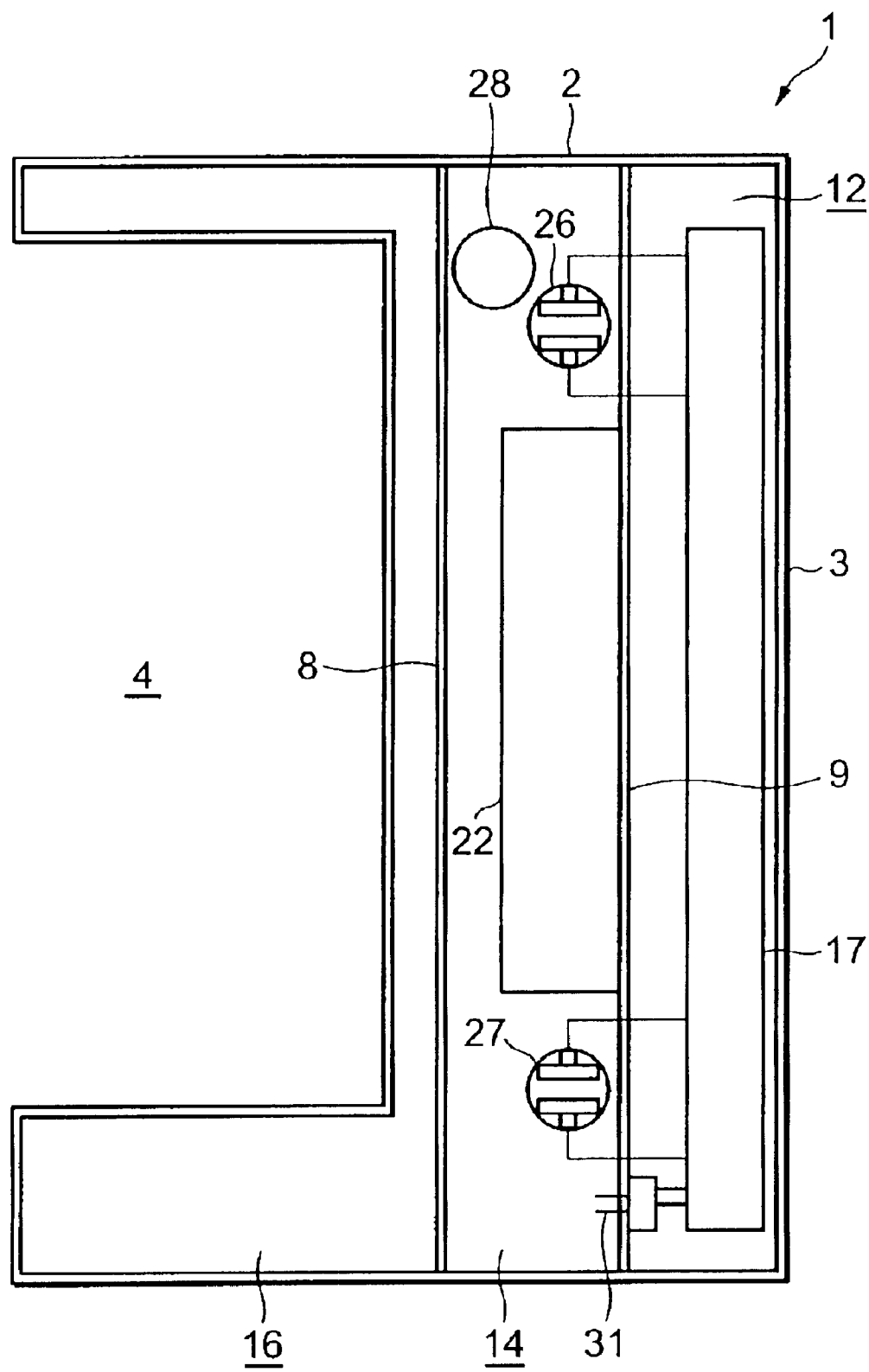
FIG. 3 is a cross sectional view of the water treating apparatus at a line A—A in FIG. 2.
Figure 4:
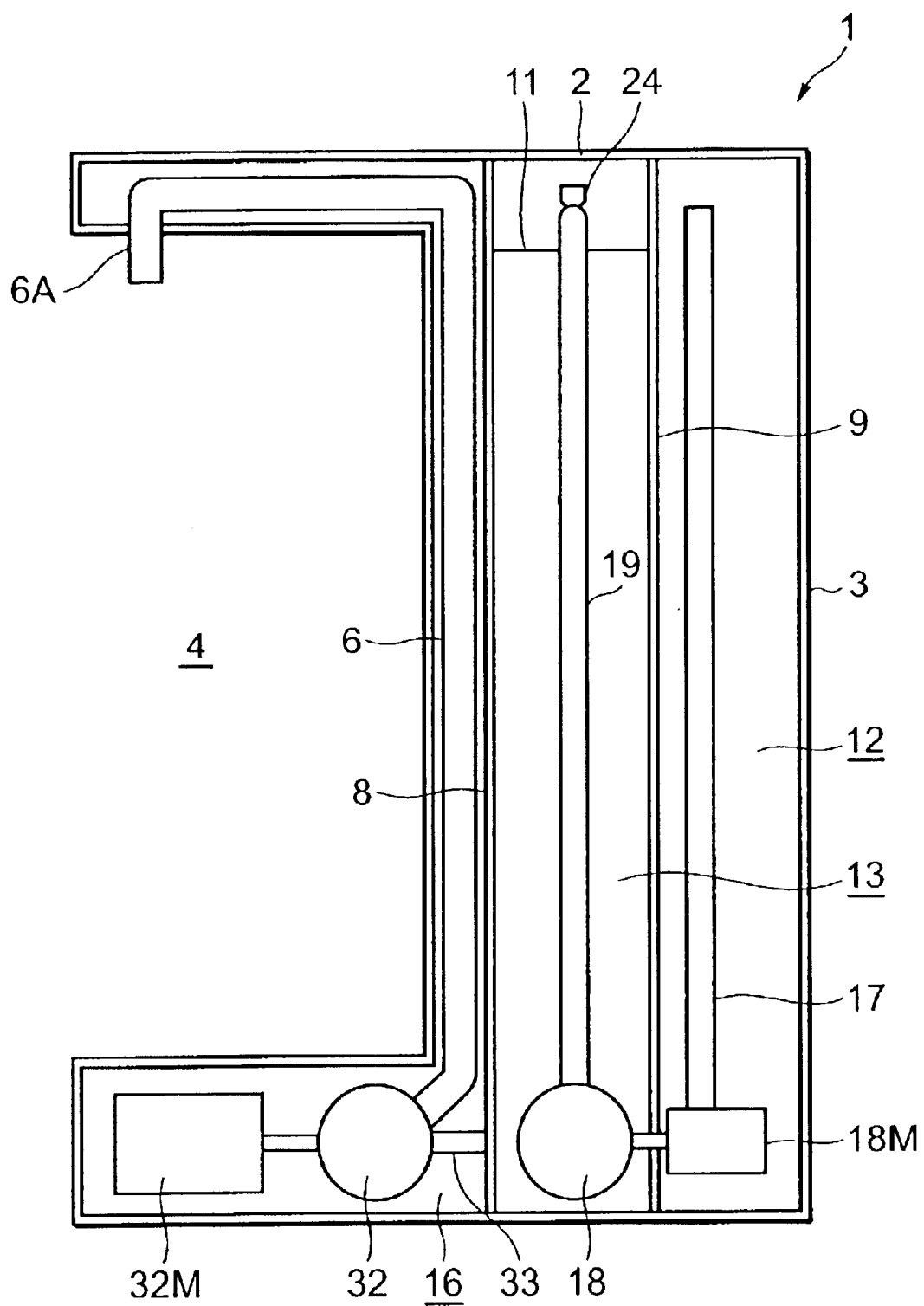
FIG. 4 is a cross sectional view of the water treating apparatus at a line B—B in FIG. 2.
Figure 5:
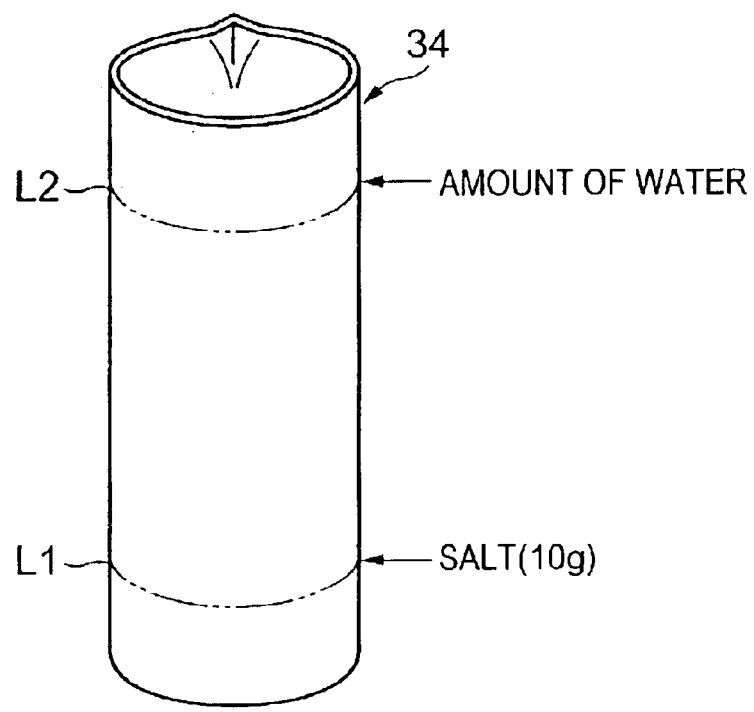
FIG. 5 is an oblique perspective view of a container for producing a salt water which is used in the present invention.

FIG. 5 shows a container 34 for producing a salt water to be fed into the salt water chamber 13. The container 34 has the shape of a cup with its top surface opened and also has a salt graduation line L1 and a water graduation line L2 engraved on its side face. When a salt which is generally constantly stocked in a household is poured to the salt graduation line L1 (10 g in the present embodiment) and service water is then extracted to the water graduation line L2 so as to mix them together, an extremely highly concentrated salt water can be produced in the container 34. Then, the thus produced salt water of given concentration is fed into the salt water chamber 13.

FIG. 9 shows a front view of a control panel 7. On the control panel 7, a power switch 36, an "in-production" LED 37, a "usable" LED 38 and a "insufficient salt water" LED 39 are placed in a line from the right to the left. The "in-production" LED 37 is kept on while electrolysis is being carried out in the electrolysis chamber 14 in a manner to be described later. Further, the "usable" LED 38 is lit when production of an electrolytic water containing hypochlorous acid at a high concentration by the electrolysis in the electrolysis chamber 14 is completed. In addition, the "insufficient salt water" LED 39 is lit when the salt water in the salt water chamber 13 is insufficient.

Figure 10:
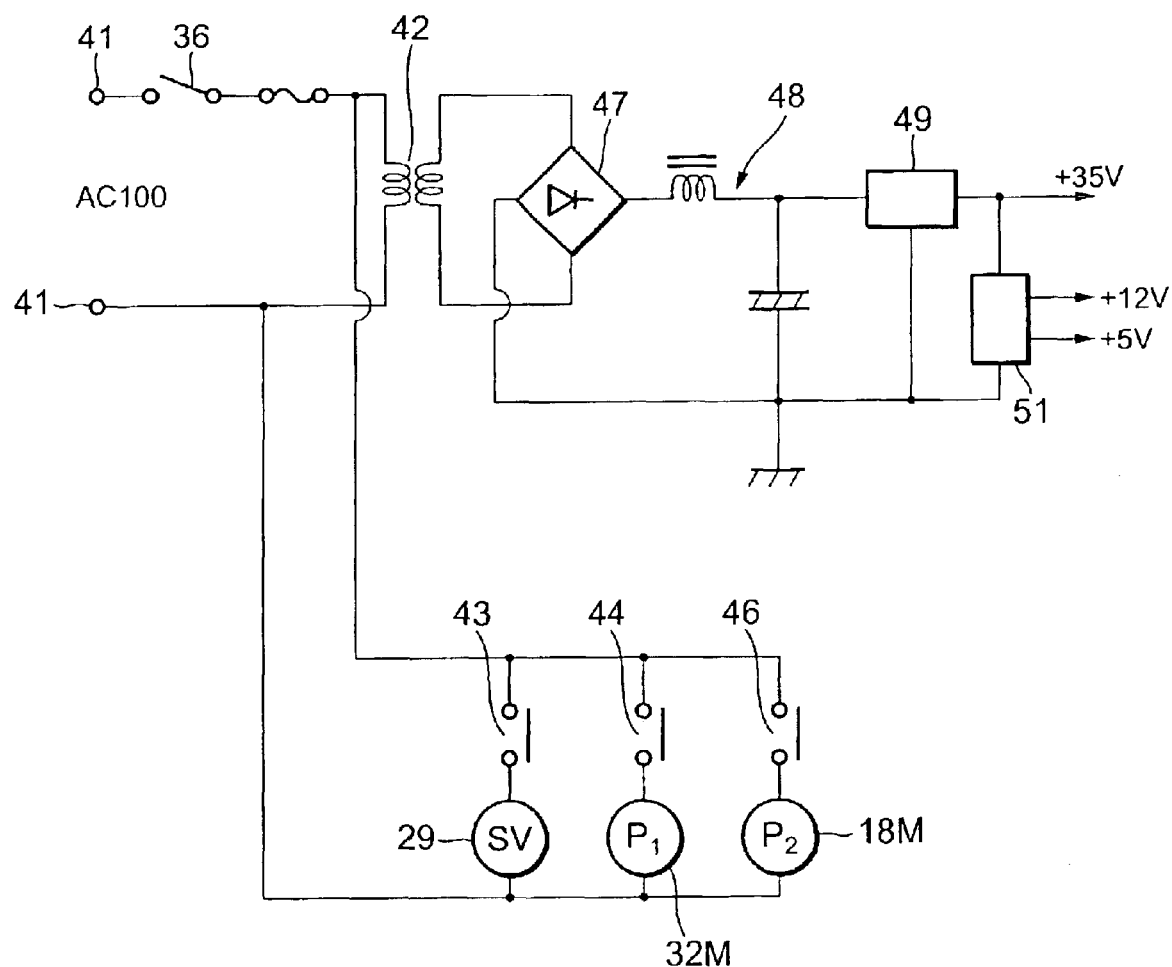
FIG. 10 is an electric circuit diagram with respect to a power supply of the water treating apparatus of FIG. 1.
Figure 11:
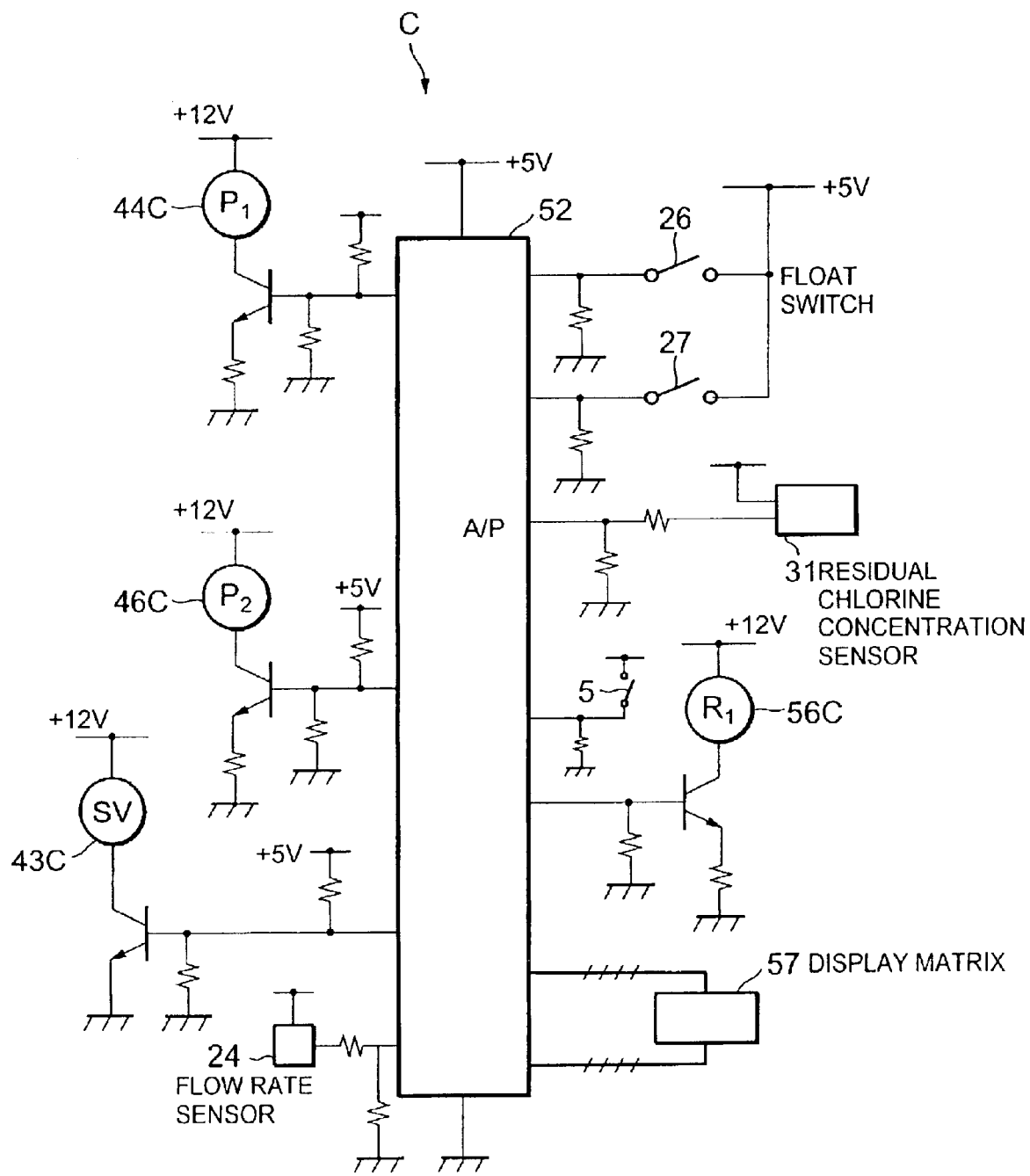
FIG. 11 is an electric circuit diagram of a control device of the water treating apparatus of FIG. 1.
Figure 12:
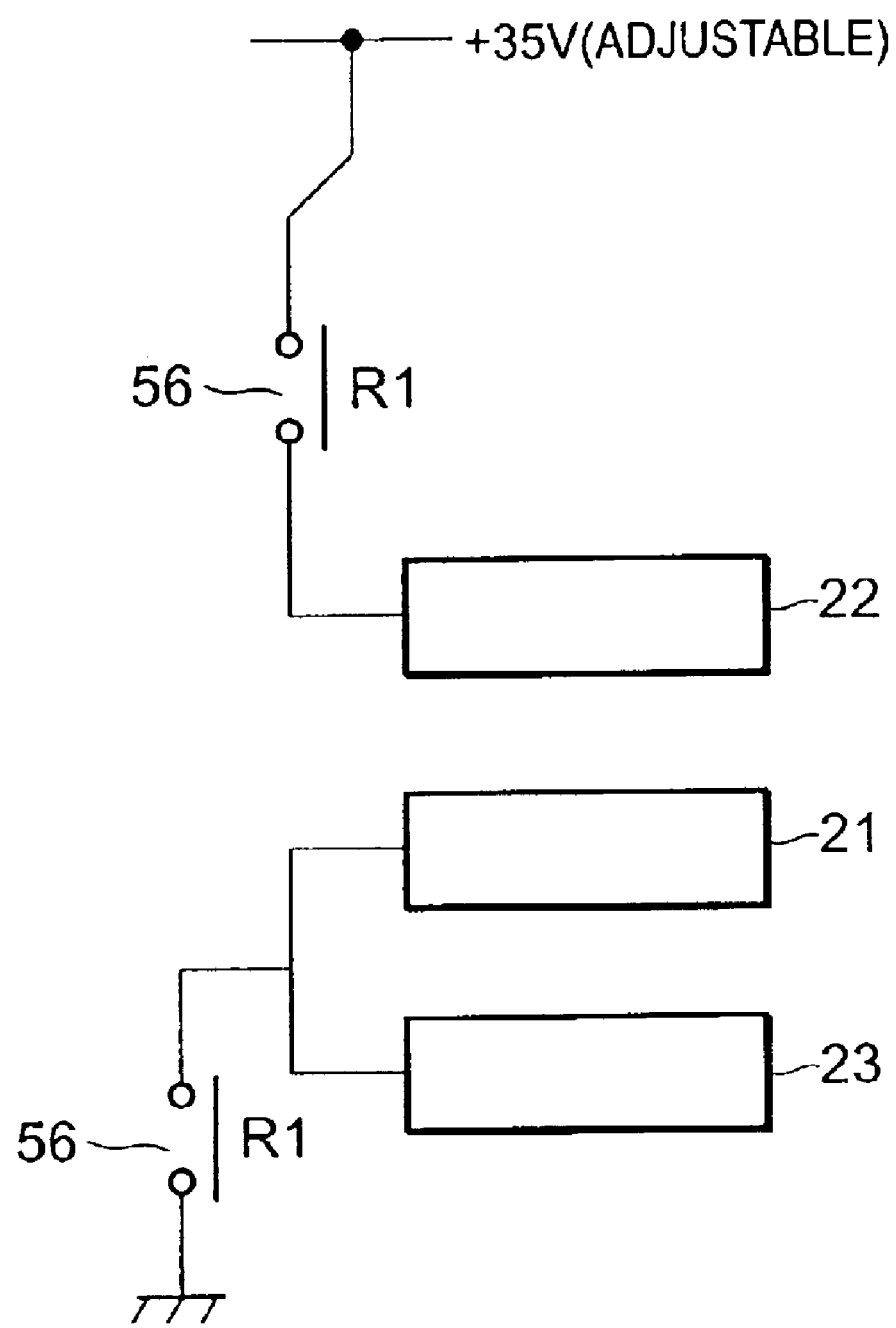
FIG. 12 is an electric circuit diagram with respect to electrodes of the water treating apparatus of FIG. 1.

FIGS. 10 to 12 show electric circuits of the water treating apparatus 1 of the present invention. In FIG. 10, reference numeral 41 denotes domestic use power supply (an alternating voltage of 100 V(in Japan) or 220 V(in US,EP)). To the domestic use power supply 41, via the power switch 36, a transformer 42 (primary side), a series circuit comprising the electromagnetic valve 29 and a relay switch 43, a series circuit comprising the motor 32M for the electrolytic water pump 32 and a relay switch 44, and a series circuit comprising the motor 18M for the salt water pump 18 and a relay switch 46 are connected in parallel.

To a secondary side of the foregoing transformer 42, a full-wave rectification circuit 47 which comprises a diode bridge and a smoothing circuit 48 which comprises a coil and a condenser are connected, followed by a direct current power circuit 49 for generating a direct current voltage of 35 V (DC of +35 V, which can be increased or decreased from 35 V). Further, to an output of the direct current power circuit 49, another power circuit 51 for generating direct current voltages of 12 V and 5 V is connected.

The foregoing domestic use power supply 41 is supplied from an outlet socket of the water treating apparatus 1 which is not shown. An alternating voltage of 100 V(or 220 V) from the domestic use power supply 41 is firstly stepped down by the transformer 42, subjected to full-wave rectification by the full-wave rectification circuit 47, and then smoothed by the smoothing circuit 48. Then, the resulting voltage is supplied to the direct current power circuit 49 in which a direct current voltage of 35 V (DC +35 V) is produced, and by the power circuit 51, direct current voltages of 12 V (DC +12 V) and 5 V (DC +5 V) are further produced. The direct current voltage of 35 V is fed to the electrodes 21 to 23 as will be describe later. Further, the direct current voltage of 12 V serves as a power source for relays, and the direct current voltage of 5 V serves as a power source for a microcomputer 52 to be described later, other electric circuits, and the water level sensors 26 and 27.

In FIG. 11, a control device C is constituted by a general-purpose microcomputer 52. To the microcomputer 52, via circuits for driving resistors and transistors, coils 43C, 44C and 46C of the foregoing relay switches 43, 44 and 46 and coils 56C of two relay switches 56 for the electrodes 21 and 22 are connected. Further, to the microcomputer 52, contact outputs of the foregoing water level sensors 26 and 27 are also connected, and outputs of a residual chlorine concentration sensor 31 and the flow rate sensor 24 are also connected. In addition, to the microcomputer 52, a display matrix circuit 57 for lighting the LEDs 37 to 39 on the foregoing control panel 7 is also connected. Furthermore, to the microcomputer 52, an output of the foregoing discharge button 5 is also connected.

In FIG. 12, of the foregoing three electrodes 21 to 23, the electrode 22 sandwiched between the remaining two electrodes is connected to the direct current voltage of 35 V via the relay switch 56. Further, the left electrode 21 and the right electrode 23 are earthed via the relay switch 56. Thereby, the direct current voltage of 35 V is applied between the electrodes 21 and 22 and between the electrodes 23 and 22, and by means of the relay switches 56, applications of the voltage to the electrodes are switched between an "ON" state and an "OFF" state simultaneously.

Figure 13:
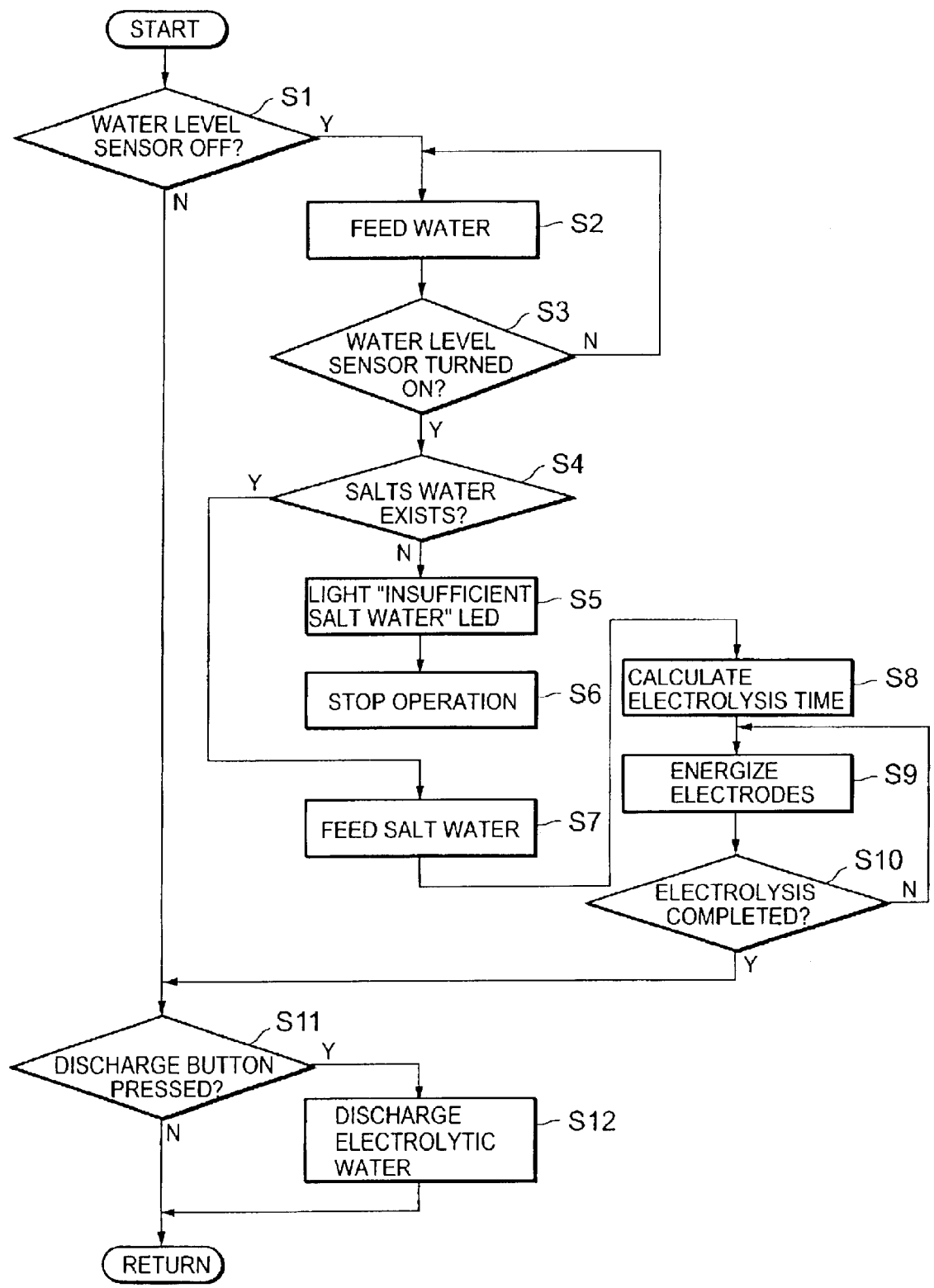
FIG. 13 is a flowchart of operations of a microcomputer which constitutes the control device of the water treating apparatus of FIG. 1.

With the above constitution, hereinafter, operations of the water treating apparatus 1 of the present invention will be described with reference to a flowchart in FIG. 13. Firstly, the highly concentrated salt water is prepared in the container 34 and poured into the salt water chamber 13 from the top with the top lid 2 opened as described above. Then, upon press of the power switch 36, the microcomputer 52 of the control device C determines in STEP S1 whether the water level sensor 27 is off or not. If the level of water in the electrolysis chamber 14 is lower than the position of the water level sensor 27, indicating that the water level sensor 27 is off, the microcomputer 52 proceeds to STEP S2 so as to open the electromagnetic valve 29 and introduce service water into the electrolysis chamber 14 by means of the service water introducing pipe 28 (water feeding).

Then, the microcomputer 52 determines in STEP S3 whether the water level sensor 26 has been turned on or not. If the level of the water in the electrolysis chamber 14 is lower than the position of the water level sensor 26, indicating that the water level sensor 26 remains off, the microcomputer 52 returns to STEP S2 so as to continue the water feeding. Then, when the level of the water in the electrolysis chamber 14 has reached the position of the water level sensor 26, whereby the water level sensor 26 has been turned on, the microcomputer 52 proceeds to STEP S4.

In this STEP S4, the microcomputer 52 operates the salt water pump 18 (motor 18M). If the salt water which is caused to flow through the salt water feed pipe 19 by the operation can be detected by the flow rate sensor 24, the microcomputer 52 determines that the salt water chamber 13 contains the salt water and proceeds to STEP S7. Meanwhile, if the salt water was not charged into the salt water chamber 13, the flow rate sensor 24 cannot detect flow of the salt water, so that the microcomputer 52 determines that the salt water is insufficient, proceeds from STEP S4 to STEP S5 so as to light the "insufficient salt water" LED 39 and stops operation in STEP S6.

Meanwhile, in STEP S7, the microcomputer 52 feeds a predetermined amount (for example, 1 cc) of the salt water to the electrolysis chamber 14 and adds the salt water to the service water by means of the salt water pump 18 based on an output of the flow rate sensor 24. Then, the microcomputer 52 calculates electrolysis time (time during which a voltage is applied to the electrodes 21 to 23) in STEP S8. The microcomputer 52 determines the electrolysis time such that 30 to 90% of chlorine in the electrolysis chamber 14 can be converted into hypochlorous acid through an electrochemical reaction and that the concentration of hypochlorous acid produced would be not lower than 5,000 mg/L, based on the concentration of chlorine in the service water in the electrolysis chamber 14 which is detected by the residual chlorine concentration sensor 31.

For example, a table representing correlations between concentrations of chlorine detected by the residual chlorine concentration sensor 31 and times during which a direct current voltage is applied to the electrodes 21, 22 and 23 and which are required to achieve a concentration of produced hypochlorous acid of not lower than 5,000 mg/L is obtained in advance based on experiments and calculations and stored in a memory (such as RAM and ROM) to be used for calculation of the electrolysis time (application time). In this case, the volume of the for-treatment water is a total of the volume of the water reaching and activating the water level sensor 26 in the electrolysis chamber 14 and 1 cc of the salt water, and electrolysis times (application times) during which 30 to 90% of the salt in the electrolysis chamber 14 can be converted into hypochlorous acid through the electrochemical reaction are set in consideration of an error in measurement of 1 cc of the salt water, an error in operation of the water level sensor 26, an error in measurement of the temperature of the for-treatment water (temperature of the service water), an error in measurement made by the residual chlorine concentration sensor 31, and other errors. Thereby, most of the added salt water can be converted into hypochlorous acid, the salt can be used effectively, the concentration of chlorine in the produced electrolytic water can be kept low, and the reaction of the for-treatment water can be controlled by the salt during the use of the electrolytic water.

Further, a rate of conversion of the salt into hypochlorous acid by the electrochemical reaction increases (rate of the increase changes according to temperature, current densities of the electrodes and other factors) along with passage of the application time (energization time) for the electrodes 21, 22 and 23, but after a certain amount of the salt is converted, the water is saturated with hypochlorous acid, thereby slowing down the increase in the conversion rate. Accordingly, in the present embodiment, time required to convert 90% of the salt in the electrolysis chamber 14 into hypochlorous acid is taken as a maximum electrolysis time (maximum application time). Hence, times set in the table used for calculation of the electrolysis time do not exceed the time required to convert 90% of the salt in the electrolysis chamber 14 into hypochlorous acid. Further, in this table, times required to convert at least 30% of the salt in the electrolysis chamber 14 into hypochlorous acid, whereby effective use of the added salt can be accomplished.

Further, considering effective use of the salt to be added and time required to produce an electrolytic water from an economical standpoint, times set in the table used for the calculation of the electrolysis time are times required to convert 50 to 80% of the salt in the electrolysis chamber 14 into hypochlorous acid. In consideration of a power source for domestic use (when a direct current voltage of about 20 to 50 V is used), production time and other factors, such times are suitable for production of hypochlorous acid in an ordinary household.

After setting the electrolysis time as described above, the microcomputer 52 starts to energize the electrodes 21 to 23 in STEP S9 so as to apply a direct current voltage thereto and lights the "in-production" LED 37. Then, the microcomputer 52 determines in STEP S10 whether the electrolysis time set as described above has elapsed or not. If the electrolysis time has not elapsed yet, the microcomputer 52 returns to STEP S9 and continues energizing the electrodes 21 to 23.

Since the electrode 22 is covered with the coating containing palladium or ruthenium, hypochlorous acid (HClO) and hypochlorous acid ions (ClO⁻) are vigorously produced on the electrode 22 which acts as an anode in the service water in the electrolysis chamber 14 by the energization. The electrochemical reaction is represented by the following formulae (1) to (4).

Chemical Reactions on Electrode 22 Acting as Anode $$2H_2O \rightarrow 4H^+ + O_2\uparrow + 4e^- \qquad (1)$$

$$2Cl^- \rightarrow Cl_2 + 2e^- \qquad (2)$$

$$H_2O + Cl_2 \leftrightharpoons HClO + H^+ + Cl^- \qquad (3)$$

(Of these, $O_2$ and $Cl_2$ are diffused in air.)

Chemical Reaction on Electrodes 21 and 23 Acting as Cathodes $$2H_2O + 2e^- \rightarrow H_2\uparrow + 2OH^- \qquad (4)$$

(Of these, $H_2$ is diffused in air.)

Further, during the energization, the microcomputer 52 controls the voltage to be applied to the electrodes 21 to 23 based on the concentration of hypochlorous acid in the electrolysis chamber 14 which is detected by the residual chlorine concentration sensor 31 so that the foregoing target concentration of hypochlorous acid can be achieved upon completion of the electrolysis time. Further, since the coating on the electrode 22 also contains platinum and iridium, ozone and active oxygen are also produced on the electrode 22 in the service water in the electrolysis chamber 14 by the energization.

Then, upon completion of the set electrolysis time, the microcomputer 52 turns off the "in-production" LED 37, turns on the "usable" LED 38, and proceeds from STEP S10 to STEP S11. At this point, 30 to 90% (or 50 to 80%) of chlorine in the service water in the electrolysis chamber 14 is already converted into hypochlorous acid by the electrochemical reaction, and an electrolytic water containing produced hypochlorous acid at a concentration of not lower than 5,000 mg/L is produced.

In STEP S11, the microcomputer 52 determines whether the discharge button 5 has been pressed or not. If it has not been pressed, the microcomputer 52 returns to START. When a user places a cup or the like in the extraction portion 4 right underneath the discharge opening 6A of the extraction pipe 6 and presses the discharge button 5 (so as to close the contact), the microcomputer 52 proceeds to STEP S12 so as to operate the electrolytic water pump 32, thereby discharging the electrolytic water produced in the electrolysis chamber 14 from the discharge opening 6A.

Using the thus discharged electrolytic water for sterilizing a bathroom, air conditioning equipment and other places, there is no need to purchase a chlorine-based bactericide for sterilizing them. Particularly, since hypochlorous acid at a concentration of not lower than 5,000 mg/L is produced, it can exhibit an effective sterilizing ability even inside bacteria. In addition, since the electrolytic water also contains ozone and active oxygen, a sterilizing effect is further improved.

In the present embodiment, although hypochlorous acid at a concentration of not lower than 5,000 mg/L is produced in the electrolysis chamber 14, the concentration of hypochlorous acid is not limited to the particular concentration, and a satisfactory effect of sterilizing a bathroom, air conditioning equipment and other places in an ordinary household can be achieved as long as the concentration is 1,000 mg/L or higher.

As described in detail above, according to the water treating apparatus of the present invention, by use of service water, an electric power supply for domestic use and a constantly stocked salt in a household, an electrolytic water containing hypochlorous acid at a high concentration can be produced by the catalytic action of palladium or ruthenium of the electrode. Thereby, without purchasing a chlorine-based bactericide, a hypochlorous acid-containing electrolytic water having a satisfactory sterilizing ability can be produced in a household by the electrochemical reaction and used for sterilizing a bathroom, air conditioning equipment, and the like. As a result, a significant reduction in costs can be achieved.

Further, according to the present invention, since the coating further contains platinum and iridium oxide, ozone and active oxygen can be produced by the electrochemical reaction and used for sterilization.

Further, according to the present invention, since the amount of time required for the application of the voltage to the electrodes is set based on the concentration of chlorine in the for-treatment water prior to the application of the voltage, hypochlorous acid can be produced at a desired high concentration by adjusting the amount of time required for the application of the voltage to the electrodes based on the concentration of chlorine in the for-treatment water in which hypochlorous acid is to be produced.

Further, according to the present invention, since the voltage is applied to the electrodes based on the concentration of hypochlorous acid in the for-treatment water, highly concentrated hypochlorous acid required can be produced by adjusting the voltage to be applied based on the concentration of hypochlorous acid.

Further, according to the present invention, since the concentration of hypochlorous acid produced in the for-treatment water is not lower than 5,000 mg/L, the hypochlorous acid-containing electrolytic water having an extremely high sterilizing ability is produced, so that a high degree of sterilization of a bathroom, air conditioning equipment and the like in a household can be achieved securely.

What is claimed is:

1. A water treating apparatus for producing hypochlorous acid in for-treatment water containing a salt by use of an electrochemical reaction which occurs in the for-treatment water when a direct current voltage is applied to at least a pair of electrodes oppositely disposed in the for-treatment water, comprising:

a residual chlorine concentration sensor for detecting the concentration of chlorine in the for-treatment water, a direct current power circuit for applying a direct current voltage to the electrodes, and a control device which sets the amount of time required for the application of the direct current voltage from the direct current power circuit to the electrodes based on the concentration of chlorine in the for-treatment water detected by the residual chlorine concentration sensor.

2. A water treating apparatus for producing hypochlorous acid in for-treatment water containing a salt by use of an electrochemical reaction which occurs in the for-treatment water when a direct current voltage is applied to at least a pair of electrodes oppositely disposed in the for-treatment water, comprising:

a residual chlorine concentration sensor which detects the concentration of chlorine in the for-treatment water;

a direct current power circuit for applying a direct current voltage to the electrodes, and a control device for applying the direct current voltage from the direct current power circuit to the electrodes for an amount of set time and adjusts the direct current voltage to be applied to the electrodes based on the concentration of chlorine in the for-treatment water detected by the residual chlorine concentration sensor.

3. The apparatus of claims 1 or 2, wherein the amount of time set by the control device is the time required to convert at least 30% of the salt contained in the for-treatment water into hypochlorous acid by the electrochemical reaction.

4. The apparatus of claim 1 or 2, wherein the amount of time set by the control device is the time required to convert 50 to 80% of the salt contained in the for-treatment water into hypochlorous acid by the electrochemical reaction.

5. The apparatus of claims 1 or 2, wherein the amount of time set by the control device is the time required to convert the concentration of hypochlorous acid produced in the for-treatment water to be not lower than 1,000 mg/L.

6. The apparatus of claim 5, wherein the amount of time set by the control device is the time required to produce the hypochlorous acid in the for-treatment water at a concentration of not lower than 5,000 mg/L.

7. The apparatus of claims 1 or 2, wherein the amount of time set by the control device is the time required so that the concentration of hypochlorous acid produced in the for-treatment water is not lower than 5,000 mg/L.

8. The apparatus of claims 1 or 2, wherein the amount of time set by the control device is the time required to convert not more than 90% of the salt contained in the for-treatment water into hypochlorous acid by the electrochemical reaction.

9. The apparatus of claims 1 or 2, wherein at least one electrode is made of titanium with a coating containing at least one of palladium or ruthenium.

10. The apparatus of claim 9, wherein the coating further contains platinum and iridium oxide.

11. The apparatus of claim 10, wherein the amount of time required for application of the voltage to the electrodes is set based on the concentration of chlorine in the for-treatment water before the application of the voltage.

12. The apparatus of claim 11, wherein the voltage is applied to the electrodes based on the concentration of hypochlorous acid in the for-treatment water.

* * * * *